United States Patent
Mounty et al.

(10) Patent No.: US 8,793,578 B2
(45) Date of Patent: Jul. 29, 2014

(54) AUTOMATING EXECUTION OF ARBITRARY GRAPHICAL INTERFACE APPLICATIONS

(75) Inventors: Daniel G. Mounty, Sunnyvale, CA (US); Michael B. O'Connor, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 13/180,015

(22) Filed: Jul. 11, 2011

(65) Prior Publication Data
US 2013/0019170 A1 Jan. 17, 2013

(51) Int. Cl.
*G06F 3/00* (2006.01)
*G06F 9/44* (2006.01)

(52) U.S. Cl.
USPC ........... 715/704; 715/762; 717/124; 717/125; 717/135

(58) Field of Classification Search
CPC ............ G06F 11/3414; G06F 11/3688; G06F 11/3664; G06F 11/323; G06F 11/3636; G06F 11/3684
USPC ........... 715/704, 762; 714/124, 125, 131, 135
See application file for complete search history.

(56) References Cited

U.S. PATENT DOCUMENTS

| | | | |
|---|---|---|---|
| 5,596,714 A * | 1/1997 | Connell | 714/38.1 |
| 5,634,002 A | 5/1997 | Polk et al. | |
| 5,781,720 A * | 7/1998 | Parker et al. | 714/38.11 |
| 5,845,008 A * | 12/1998 | Katoh et al. | 382/217 |
| 6,184,880 B1 * | 2/2001 | Okada | 715/704 |
| 7,421,683 B2 | 9/2008 | Robertson et al. | |
| 7,461,342 B2 | 12/2008 | McLean | |
| 7,627,821 B2 * | 12/2009 | Klementiev | 715/704 |
| 7,644,368 B2 * | 1/2010 | Pins | 715/762 |

(Continued)

FOREIGN PATENT DOCUMENTS

| | | |
|---|---|---|
| JP | 2004302551 | 10/2004 |
| KR | 20100108000 | 6/2010 |
| WO | 2012119222 | 9/2012 |

OTHER PUBLICATIONS

Chang, Tsung-Hsiang, et al., "GUI Testing Using Computer Vision," Apr. 2010, Proc. IEEE/WIC/ACM Int'l, Conf on Intelligent Agent Technology, pp. 1-10.*

(Continued)

*Primary Examiner* — Kieu Vu
*Assistant Examiner* — Asteway T Gattew
(74) *Attorney, Agent, or Firm* — John D. Flynn; Jack V. Musgrove (57) ABSTRACT

Interaction with an application interface is monitored and an image of the interface prior to a user interaction is compared with an image after the user interaction to identify a region of interaction. The comparison may be carried out by detecting that a threshold change has occurred using a computationally inexpensive algorithm and then drawing boundaries for the region using a more computationally intensive algorithm. A marker in a UI evolution timeline is associated with an image of the region and coordinates of the interaction normalized and relative to the region. An interaction interval and a profile of change are also stored in association with the marker. For playback, a script can be constructed from the timeline to control automated execution of the application by matching a current interval and profile to the interval and profile for a recorded interaction, and automatically applying that interaction to the current user interface.

26 Claims, 7 Drawing Sheets

(56) References Cited

U.S. PATENT DOCUMENTS

| | | |
|---|---|---|
| 7,712,074 B2 | 5/2010 | Ren |
| 7,793,154 B2 | 9/2010 | Chagoly et al. |
| 7,831,542 B2* | 11/2010 | Milov ............................ 707/602 |
| 7,917,895 B2* | 3/2011 | Givoni et al. ................. 717/124 |
| 2005/0084152 A1* | 4/2005 | McPeake et al. ............. 382/173 |
| 2008/0294985 A1* | 11/2008 | Milov ............................ 715/704 |
| 2009/0172582 A1 | 7/2009 | Miyawaki et al. |
| 2009/0199096 A1 | 8/2009 | Pop-Jordanov et al. |
| 2010/0131927 A1* | 5/2010 | Pinjala et al. ................. 717/125 |
| 2011/0131551 A1* | 6/2011 | Amichai et al. .............. 717/125 |
| 2011/0214107 A1* | 9/2011 | Barmeir et al. ............... 717/125 |
| 2011/0314343 A1* | 12/2011 | Hoke et al. ...................... 714/45 |
| 2012/0131456 A1* | 5/2012 | Lin et al. ....................... 715/704 |
| 2012/0173998 A1* | 7/2012 | Chaturvedi et al. ........... 715/762 |
| 2012/0174069 A1* | 7/2012 | Zavatone ...................... 717/124 |
| 2012/0230587 A1* | 9/2012 | Arseneau ...................... 382/182 |
| 2012/0243745 A1* | 9/2012 | Amintafreshi ................ 382/103 |

OTHER PUBLICATIONS

Chang, Tsung-Hsiang, et al., "GUI Testing Using Computer Vision," Proc. IEEE/WIC/ACM Int'l. Conf. on Intelligent Agent Technology, Apr. 2010.

Chisholm, Brad, "Automated Testing of SAS System GUI Applications." downloaded on Nov. 30, 2010, from the Internet URL: http://www2.sas.com/proceedings/sugi22/APPDEVEL/PAPER10.PDF.

Varadarajan, Govin, et al., "Using TPTP to Automate Functional Testing," International Business Machines Corporation (2007).

Yin, Zunliang, et al., "Actionable Knowledge Model for GUI Regression Testing," Proc. IEEE/WIC/ACM Int'l. Conf. on Intelligent Agent Technology (2005).

* cited by examiner

AUTOMATING EXECUTION OF ARBITRARY GRAPHICAL INTERFACE APPLICATIONS

BACKGROUND OF THE INVENTION

1. Field of the Invention

The present invention generally relates to computer software, and more particularly to a method of characterizing user interactions with a graphical user interface (GUI) of a program application for later use in automated execution of the GUI, such as in quality assurance testing.

2. Description of the Related Art

Computers and computer software have become ubiquitous in modern society, whether in powerful systems such as servers and technical workstations, or simpler hand-held devices such as smartphones. It is often desirable to automate the execution of a software application for a variety of purposes including testing, development, demonstration, or business process automation. Automated execution of an application is typically carried out using a script prepared by a designer or tester, i.e., a series of commands at the user interface level of the application. Early computer systems and applications used rudimentary command line (text) interfaces and basic script formats, but modern systems provide a more intuitive approach with graphical user interfaces (GUIs) that can be manipulated by other means such as a special keystroke, a keystroke combination, a graphical pointing device (mouse), or a touchscreen.

The advent of GUI-based applications has greatly increased user friendliness and acceptance of software applications but has lead to a concomitant increase in the complexity of the interface. Not only has the interface become populated with a larger number of interface objects and varieties of such objects (e.g., text fields, action buttons, check boxes, radio buttons, hyperlinks, etc.) but there is also a heavier reliance on these features of the GUI. This interface revolution presents increasingly difficult challenges for automated execution of software applications, particularly in the context of quality assurance. While it is important to ensure that any software application is working as intended, it has become necessary to diligently explore the user interface in order to adequately test common features, special functionalities, logic paths, and programmatic aspects of the application.

SUMMARY OF THE INVENTION

The present invention relates to a method of recording the evolution of a user interface for a software application, by monitoring image variations in the user interface as a user interacts with the software application executing on a computer system, detecting a user interaction with the user interface during said monitoring, comparing a first image of the user interface immediately prior to the user interaction with a second image of the user interface immediately after the user interaction to identify a region of interaction related to the user interaction, placing a marker in a user interface evolution timeline to indicate a point in time when the user interaction occurred, and storing an image of the region of interaction and coordinates of the user interaction in association with the marker. The coordinates of the user interaction are preferably normalized and relative to the region of interaction. The comparison may be carried out by detecting that a change in the user interface has occurred using a computationally inexpensive algorithm such as fuzzy pattern matching which compares the first image to the second image, and then drawing boundaries for the region of interaction using a more computationally intensive algorithm such as image diffs between the first image and the second image. If the user interaction resulted in a new user interface element which is present in the second image but not present in the first image, or the user interaction resulted in removal of a user interface element which is present in the first image but not present in the second image, the image of the region of interaction is created using the first image. An interaction interval and a profile of change for the user interaction can also be stored in association with the marker. For playback purposes, a GUI script can be constructed from the user interface evolution timeline and used to control automated execution of the software application by matching a current interaction interval and current profile to the interaction interval and profile of change for the user interaction, locating a target region in an image of the current user interface which corresponds to the region of interaction, and automatically applying the user interaction to the current user interface based on the coordinates normalized and relative to the target region.

The above as well as additional features and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Quality assurance for software applications includes rigorous testing of the graphical user interface (GUI). Complete manual testing of a GUI is generally not feasible since the number of GUI states to be verified is enormous, the number of permutations of possible inputs and events is extremely large, and there may be logic dependencies between the GUI and the underlying application. These problems are exacerbated in regression testing (when a new feature is added to an application or a bug is fixed), and can lead to both false negatives and false positives. Methods have accordingly been devised for automated testing which use GUI scripts. However, creating new GUI scripts can also be very cumbersome and time-consuming.

One approach to simplifying GUI script creation is to record actual user interactions with the application under test. Specialized software loaded on the same machine as the application monitors user input events such as mouse button clicks, keystroke commands and text entry. These tools can generate messages from the application program interface (API) layer, and at the underlying graphical framework layer (e.g., X11). Such GUI record/playback tools allow the designer or tester to capture the steps necessary to automatically recreate GUI usage scenarios. Unfortunately, as a script attempts to automate interactions deeper in an interface, it is more likely that the automation will fail. Furthermore, for more complicated graphical applications which use entirely custom UI elements, it may be impossible to craft a comprehensive script from a user interaction record. Conventional GUI test methods lack the ability to effectively identify UI elements and interact appropriately. While there are many offline image recognition and comparison algorithms capable of detecting shapes and patterns within complex images, for a real-time system such offline algorithms cannot provide the required performance. In particular, periodically applying a complex image recognition algorithm to a real-time data stream may miss pertinent details within the data stream.

To solve these problems the majority of GUI record/playback automation tools limit the effectiveness of the image recognition algorithms used to identify relevant user interface elements. The analysis is typically restricted to some specific region of the image, or uses more naive image recognition methods. In this way a sufficiently small time interval can be maintained between user interface samples to catch most relevant events. The trade-off, however, is that less complex image recognition algorithms are less robust to changes in detail (e.g., different fonts), position (e.g., different dialog placement) and peripheral state (e.g., different window decorations or desktop backgrounds). It would, therefore, be desirable to devise an improved method of GUI script creation which could more accurately mirror how a user interacts with the application irrespective of the underlying implementation details. It would be further advantageous if the method could robustly deal with differing interface element placement between runs of an application.

Figure 1:
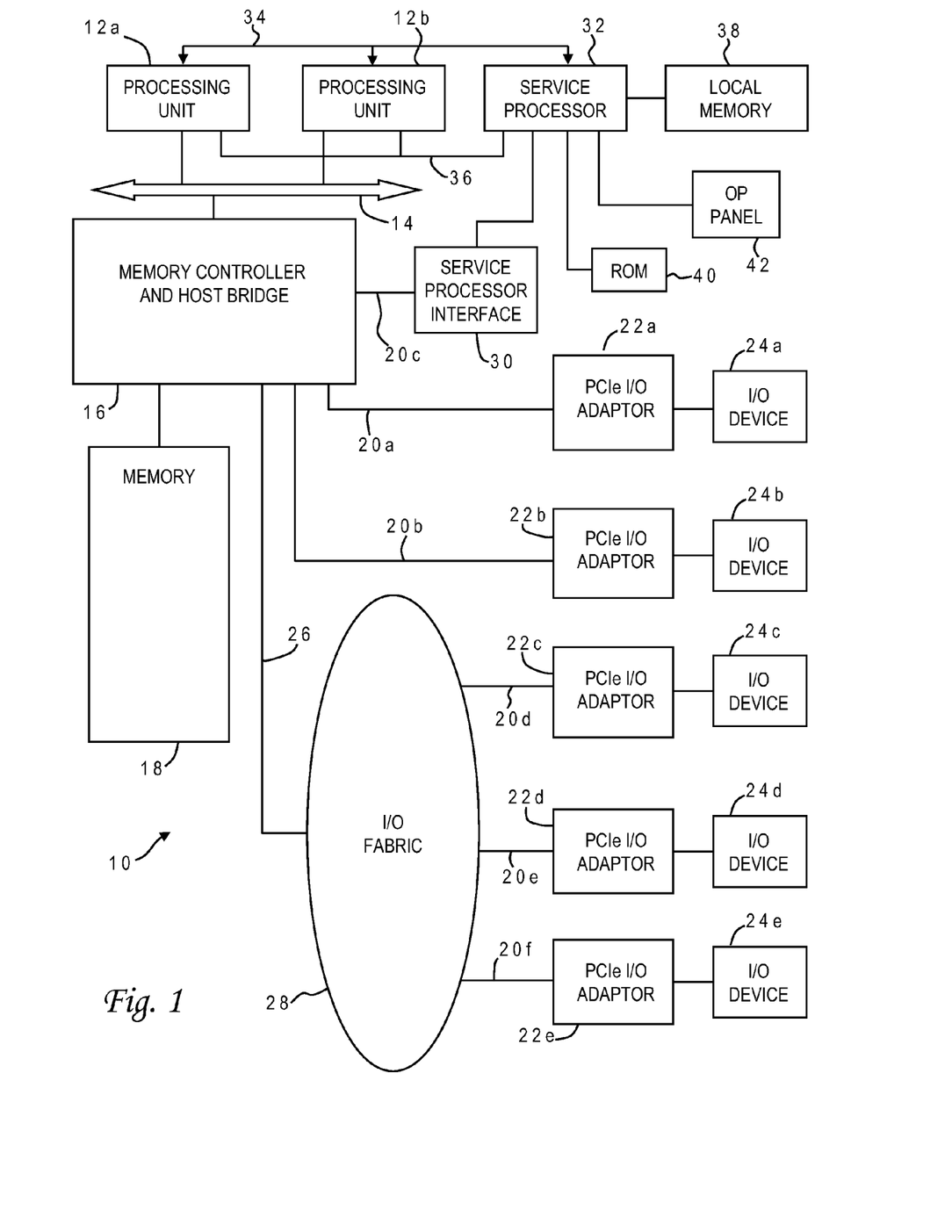
FIG. 1 is a block diagram of a computer system programmed to carry out automated GUI testing in accordance with one implementation of the present invention.

With reference now to the figures, and in particular with reference to FIG. 1, there is depicted one embodiment 10 of a computer system in which the present invention may be implemented to carry out automated execution of arbitrary graphical interface applications, particularly for GUI testing. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI)

Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the GUI record/playback tool of the present invention which may be stored in a hard disk drive of the system (an I/O device 24) or other computer readable storage medium such as an optical disk (e.g., CD or DVD). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a GUI testing process that uses novel capture techniques to detect and record user interactions with the software application under test. Computer system 10 may also be used to automatically playback these stored user interactions in scripted form at a later time for testing or other purposes. Accordingly, a program embodying the invention may additionally include conventional aspects of various GUI testing tools, and these details will become apparent to those skilled in the art upon reference to this disclosure.

Figure 2A:
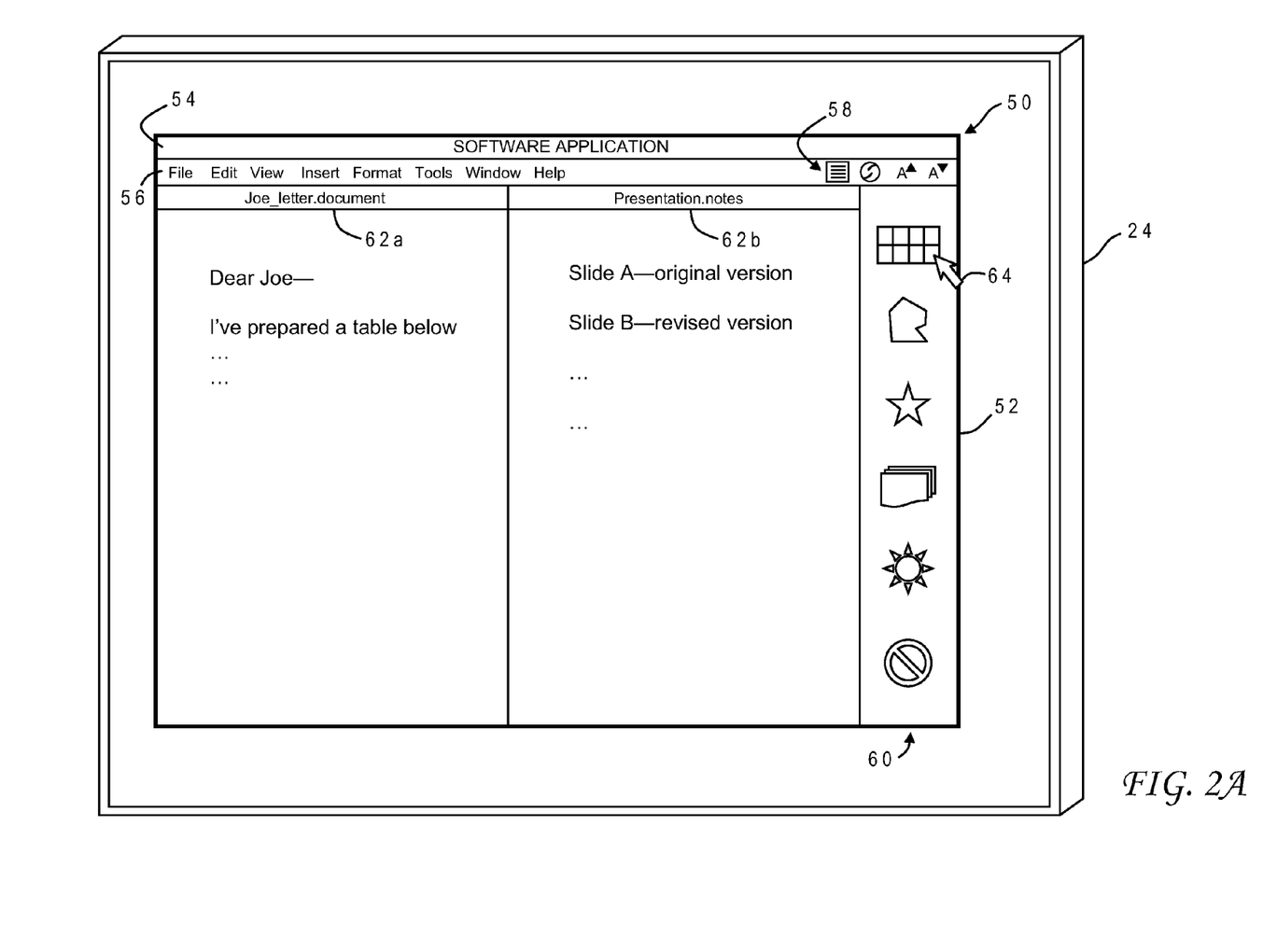
FIGS. 2A-2C are screenshots illustrating user interactions with a graphical user interface of a software application which are recorded in accordance with one implementation of the present invention.
Figure 2B:
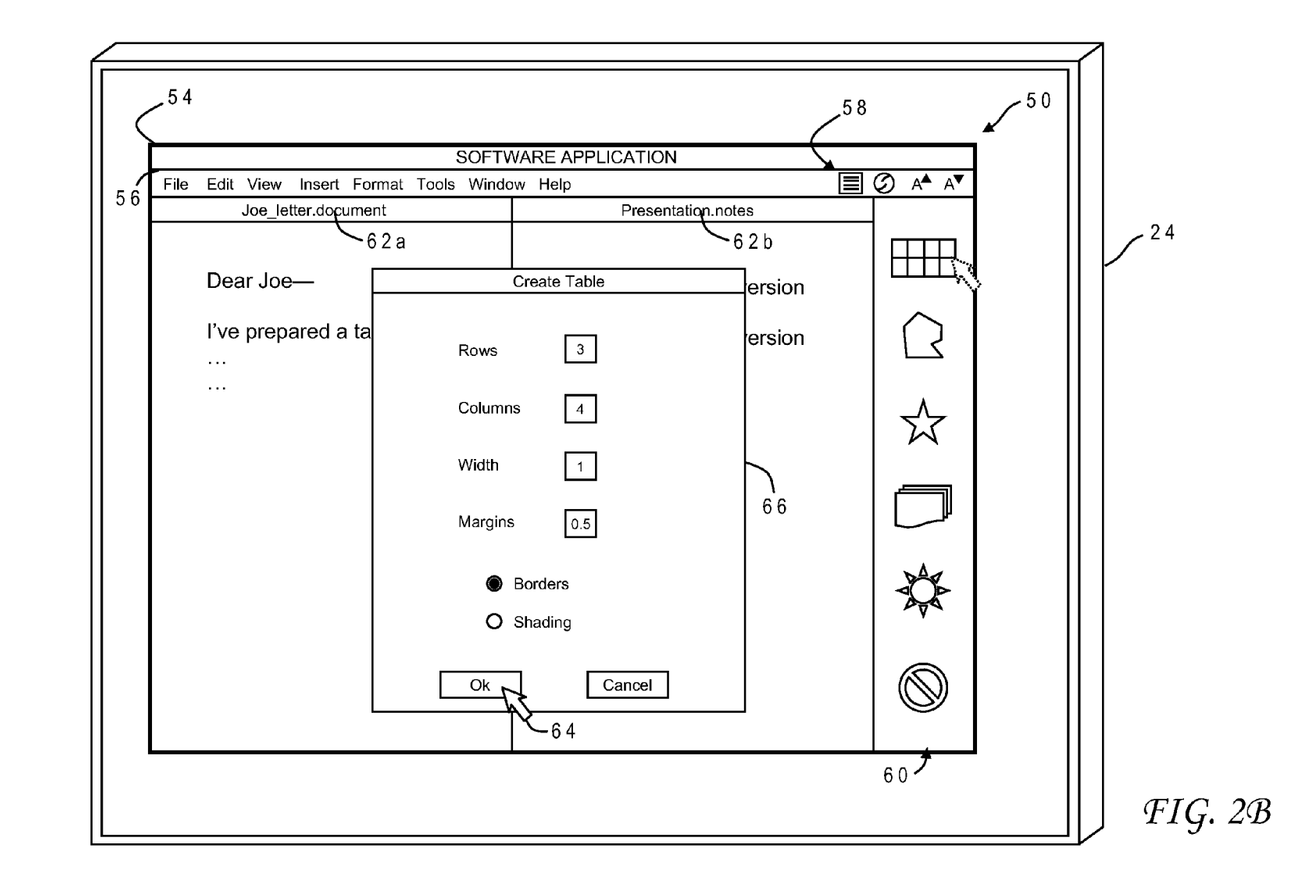
Figure 2C:
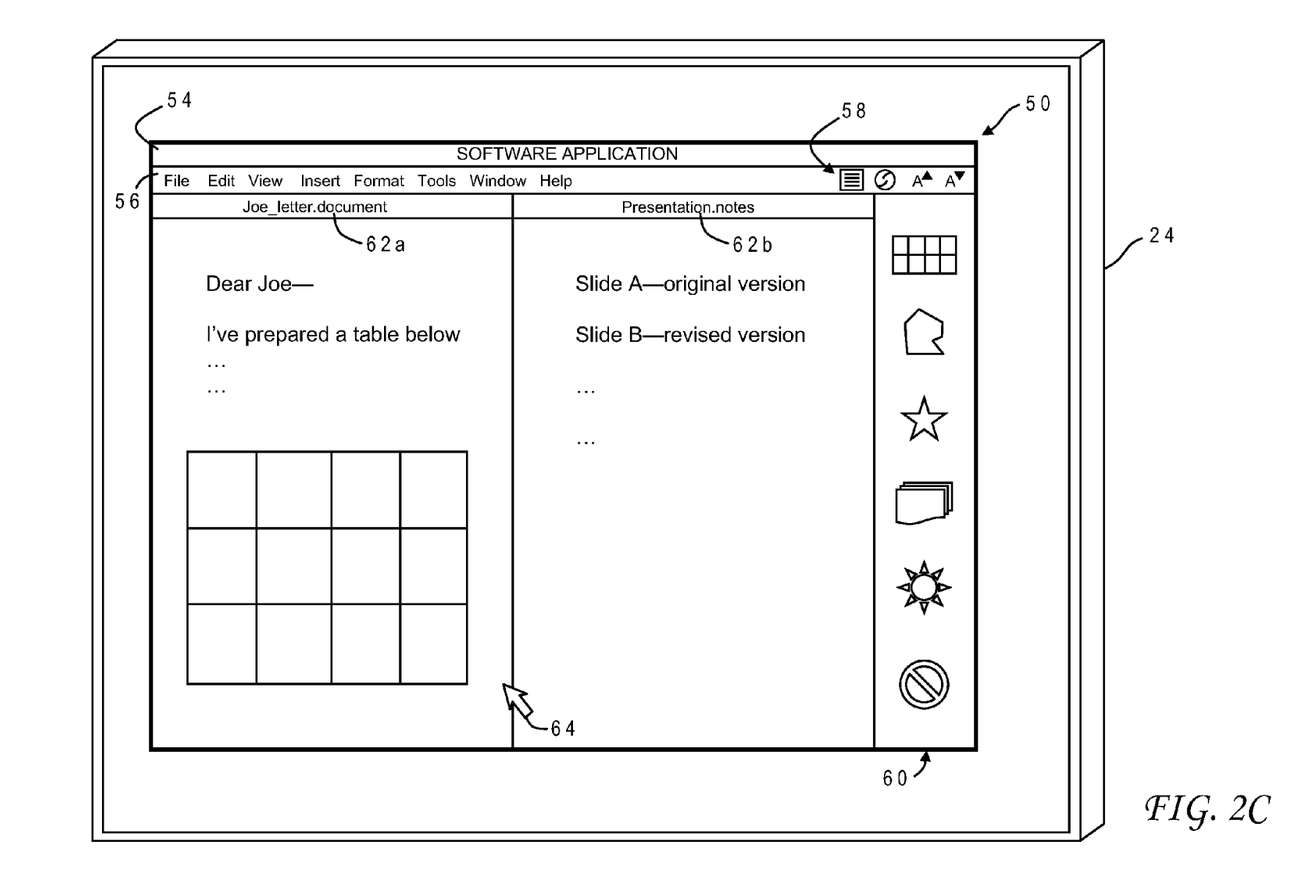

Referring now to FIGS. 2A-2C, there is depicted an example of a user interface for a program (software application) running on computer system 10 which is to be tested or whose execution is to be otherwise automated. The user interface is displayed on a display device 24 such as an LCD panel. In this example the software application is a document editor and the user interface includes a parent window 50 having a generally rectangular frame 52 and interior features including a title bar 54, a command bar 56, a small icon set 58, a large icon set 60, and two child windows 62a, 62b. Those skilled in the art will appreciate that these interface features are not exclusive and the present invention is not limited to any specific attributes of the user interface. The user may use various keystrokes or keystroke combinations on a keyboard to input commands which affect the user interface, and may also use a graphical pointing device (mouse) to control a pointing symbol such as an arrowhead 64 for further interaction with features of the user interface.

Computer system 10 monitors image variations in user interface 50 as a user interacts with the program application, and detects any user interactions. The images may be recorded using a screen capture utility provided by the operating system or via other means such as a remote desktop protocol or virtual network computing. Images may alternatively be captured using hardware devices attached to computer system 10. The global, temporal variation of the image can be metrically recorded to provide a profile of the user interface evolution in abstract terms. A well-chosen metric is robust to changes in resolution, fonts, and even color variation between runs of the same application. Other minor changes such as the location of mouse pointer 64 within the GUI can also be excluded. The profile can include for example a list of distinctive features currently visible in the GUI such as a parent window of the application, any child windows, toolbars such as command bars, icon bars or status bars, pull-down or pop-up menus, dialog boxes, alarms, etc. Profiles of change can further be established by comparing the differences between two successive profiles (pre- and post-event).

The types of user interactions that are recorded for later playback (scripting) may optionally be limited by selectable filters, so a tester might only allow for mouse events such as mouse button clicks or drag-and-drop while excluding keyboard events. Those skilled in the art will appreciate however that the invention is not limited to just mouse or keyboard events but contemplates any user input device including without limitation optical devices (e.g., infrared controllers), audio devices (e.g., with voice recognition), special purpose instrumentation, or advanced touchscreen events such as sliding, spreading and squeezing. The user interactions may be detected in various manners; in an illustrative embodiment the operating system provides hooks (code which intercepts function calls, messages or events) that can be used for event detection.

Further to this example, the user in FIG. 2A has moved mouse pointer 64 over an icon in the large icon set 60 which corresponds to a command for inserting a table in a document. FIG. 2B illustrates user interface 50 immediately after the appropriate mouse button has been clicked with pointer 64 over the table icon. A dialog box 66 has now appeared for user input regarding creation of a table within the current document window (child window 62a). Dialog box 66 may present a number of additional user interface features including numerical fields or radio buttons, and command buttons such as "OK" and "Cancel". Upon detecting the user interaction (mouse click on the table icon), computer system 10 compares the image of user interface 50 prior to the interaction (FIG. 2A) with the image of user interface 50 immediately after the interaction (FIG. 2B) to identify a region of interest related to the interaction.

The invention preferably identifies the region of interaction in a two-step process. First, a computationally inexpensive image recognition algorithm is employed to determine whether any threshold change at all has occurred, without characterizing that change. The region of interaction is then pinpointed in response to the determination that the image has changed, using a more computationally intensive image recognition algorithm. The simpler algorithm may be a one dimensional image metric to allow shorter sampling intervals. A one dimensional image metric is a function that transforms an image to a single numerical value, so the differences between two images can likewise be converted to a single number. This fine granularity analysis can include simple fuzzy pattern matching to identify when user interface changes occur. When the fuzzy pattern match indicates a substantial change a complex image recognition algorithm is triggered to draw the boundaries of the region. Image diffs can be used to identify differences between two images (looping over each pixel in the first image and comparing it to the pixel in the same location in the second image). The image diffs may be used by a two-dimensional image metric, including a 2-D fuzzy matching algorithm. In this way the invention retains the benefits of improved temporal granularity while also providing higher image recognition accuracy, yielding more robustness to user interface changes and environmental differences.

Image recognition and pattern matching algorithms may have various parameters that can be tuned. Given a set of reference machines with differing environments (resolution, fonts, themes, etc.) a recorded event sequence could be replayed on each machine and the parameter with the minimum fuzzyness could be automatically chosen to pass on to all reference systems for the initial detection of image change. This reduces the amount of user interaction required to produce an effective automation sequence.

Given the coordinates of the user interaction, the interaction profile, and the image diffs, computer system 10 can determine the region of the user interface that pertains to the user input event. However, the region of change in the user interface is not necessarily the region of interest which is identified as being associated with that user interaction. In the example of FIGS. 2A-2B the region of change is the dialog box 66 but that region only appeared after the user interaction (i.e., the user interaction was not with any feature of dialog box 66), so the region of interest is the parent window 52 (i.e., the user interaction was with a feature of the parent window). Computer system 10 is programmed to recognize such occurrences by examining the coordinates of the user interaction (e.g., mouse click) relative to the region of change and considering whether the region of change constitutes a profile element that was added or removed. In cases such as FIGS. 2A-2B where a new profile element has just appeared and the coordinates of the user interaction fall outside of that element, the GUI recording function understands that the region of interaction will be determined using the image for the user interface as it existed immediately prior to the user interaction (and using the associated profile information). Similarly, if a user interface element disappears as a result of another user interaction (as described further in conjunction with FIG. 2C), the region of interaction will be determined by inspecting the image immediately prior to that user interaction.

Once the user input event has been detected and a region of interaction identified, the invention places a marker in a user interface evolution timeline to indicate an event order or point in time when the user interaction occurred. The type of user interaction, the coordinates of the user interaction, the interaction interval, and a profile of change are then recorded in association with the marker. An image capture of the region of interaction (as opposed to the entire display) is also recorded with the marker. The coordinates can advantageously be normalized and relative to the region of interaction to account for GUI windows which can be variably positioned and sized. Accordingly for FIGS. 2A-2B the coordinates are normalized and relative to parent window 52.

This process is repeated for each interaction the user has with the interface. Computer system 10 continues inspecting the interface image and detecting user interactions until the parameters for the particular script recording session are satisfied. Continuing with the example of FIG. 2B, the user is happy with default settings for table creation and simply clicks on the "OK" button of dialog box 66. Upon clicking the "OK" button, dialog box 66 disappears as seen in FIG. 2C. This image change is detected and computer system 10 determines that the profile of change includes removal of dialog box 66. The region of interest is accordingly dialog box 66, and an image of that dialog box (from the previous state of the user interface) is recorded in association with the next marker along with coordinates of the mouse click relative to the dialog box, the interaction interval, and the profile of change. Although the image has also changed by the addition of a table in the letter being drafted, computer system 10 recognizes that this change is not part of the user interface because it pertains to content within a data field of the already existing child window 62a, as opposed to a new user interface element being added within user interface 50 (there is no profile change specifically associated with the table's creation).

Figure 3:
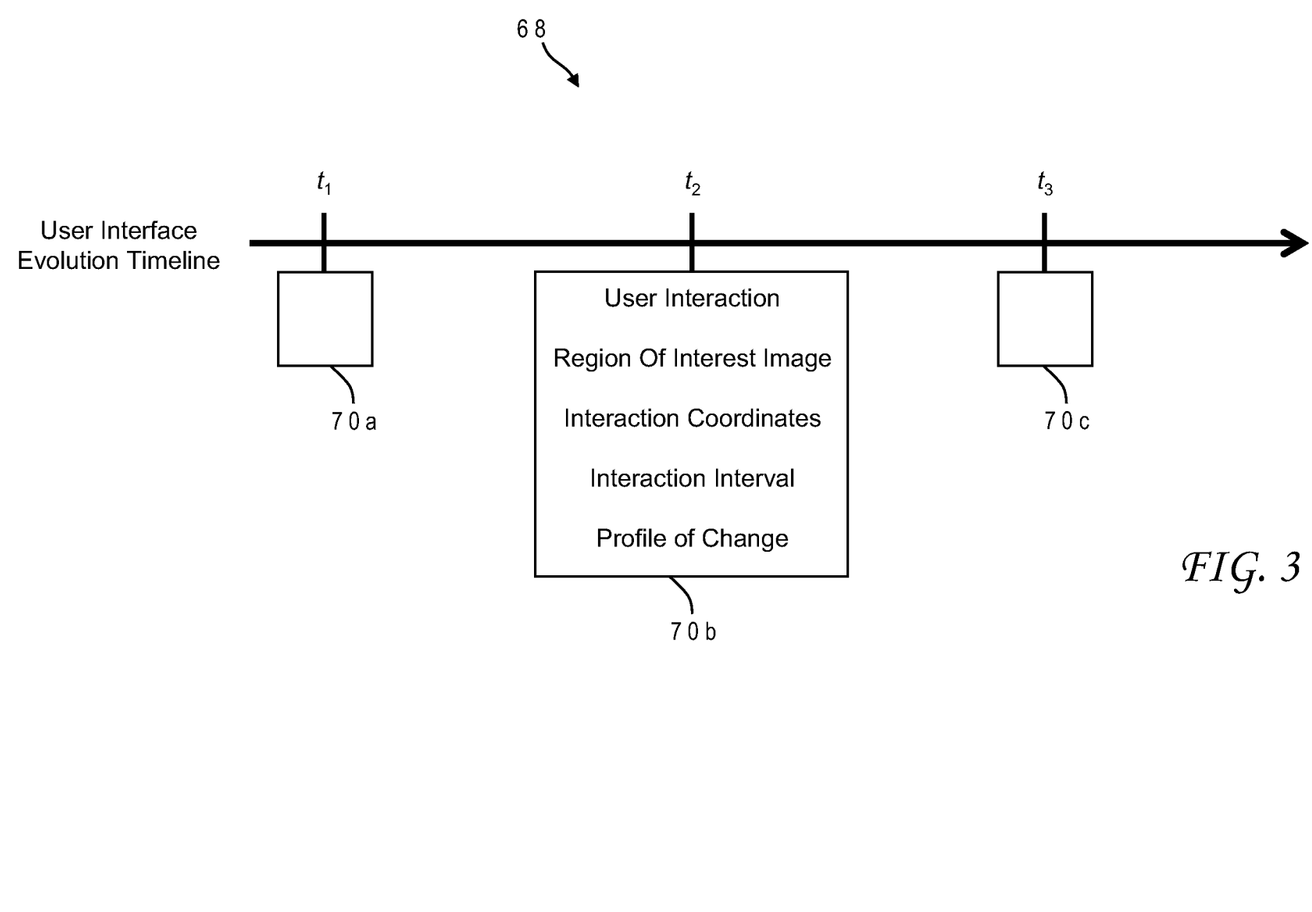
FIG. 3 is a pictorial representation of a user interface evolution timeline having markers with associated user interaction information in accordance with one implementation of the present invention.

FIG. 3 illustrates a simplified schematic of the user interface evolution timeline 68. Markers 70a, 70b, 70c have been placed at three different times $t_1, t_2, t_3$, along timeline 68. According to this implementation of the invention each marker includes a record of the type of user interaction, the image of the region of interaction, the interaction coordinates, the interaction interval, and the profile of change. While this figure depicts only three markers, it is understood that the final timeline could have hundreds or even thousands of user interactions and markers. UI evolution timeline 68 can be stored in computer system 10 for later automation, or can be stored on a portable computer-readable storage medium such as a CD, DVD, or memory stick to allow transfer of the timeline for testing on a different computer system.

Playback of user interactions with the software application being automated can be accomplished using a GUI script fashioned from all or any part, or selected parts, of UI evolution timeline 68. This GUI script is then loaded onto computer system 10. The software application can be launched before or after the GUI script is loaded. Computer system 10 monitors the interface image during program operation and establishes profiles as the interface evolves. Computer system 10 compares the current timing interval and current profile to markers in UI evolution timeline 68. If the interval and profile match a marker, the associated script command is executed. The match does not necessarily need to be perfect, e.g., the interaction interval could be within a predetermined range of the recorded interval, and the profiles might have some common elements including critically defined elements but not all matching elements. The target region in the current image of the user interface is located by any convenient means, such as normalized cross correlation against the image stored with the marker. The normalized coordinates of the interaction are applied relative to the located region within the image, and the user interaction (mouse click, etc.) is then activated at that point.

Figure 4:
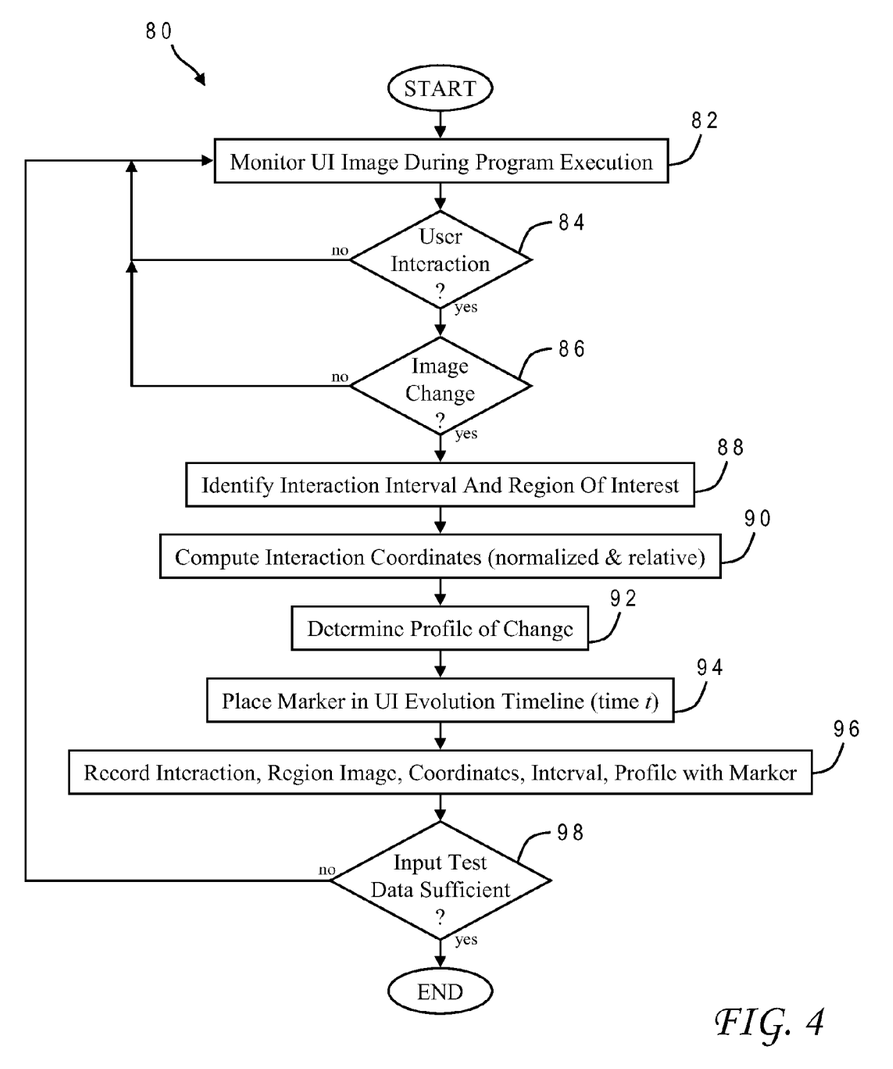
FIG. 4 is a chart illustrating the logical flow for creating a GUI script in the form of a user interface evolution timeline such as that illustrated in FIG. 3 in accordance with one implementation of the present invention.
Figure 5:
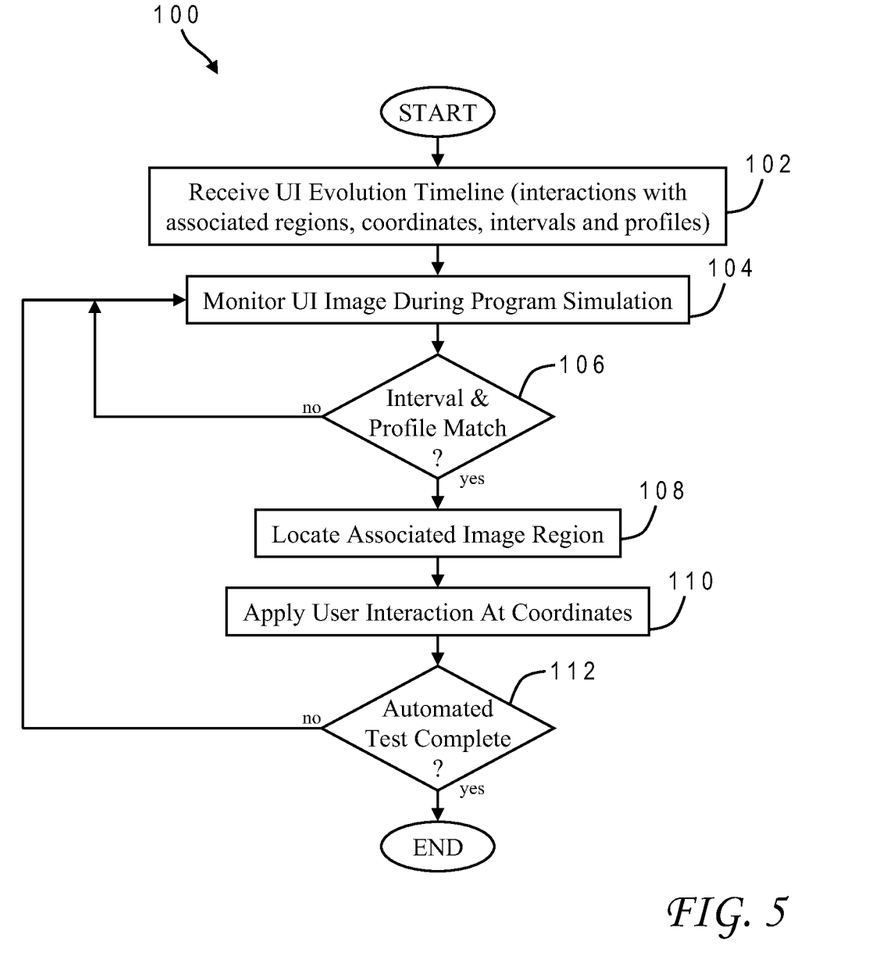
FIG. 5 is a chart illustrating the logical flow for automatic execution of a graphical interface application using a user interface evolution timeline such as that illustrated in FIG. 3 in accordance with one implementation of the present invention.

The present invention may be further understood with reference to the charts of FIGS. 4 and 5 which illustrate logical flows for GUI script recording and playback in accordance with one implementation of the present invention. In FIG. 4, the recording process 80 begins with monitoring of the user interface image during program execution of the software application 82. Computer system 10 waits for a user interaction 84. If any user interaction is detected, the quick algorithm is employed to determine is the user interface has changed 86. If there user interaction did not result in any change then computer system 10 just keeps monitoring the usage. If the user interface has changed, the interaction interval is computed and the region of interaction is identified 88. The normalized, relative coordinates of the interaction are computed 90, and the profile of change is determined 92. A marker is then placed in the UI evolution timeline at the time of the interaction 94, and the interaction, region image, coordinates, interval, and profile of changed are recorded in association with the marker 96. The process repeats from the start until there is sufficient input test data to generate a GUI script 98.

In FIG. 5, the playback process 100 begins by receiving the UI evolution timeline or a GUI script based on such a timeline 102. Computer system 10 again monitors the user interface image during automated operation of the software application 104. For each sample, the interval since the last user interaction and the current user interface profile are compared to those in the GUI script/timeline 106. When the interval and profile match, the corresponding region of interest in the current image is located 108 and the associated user interaction is applied at the relative coordinates 110. The playback process continues looking for matches and applying the appropriate user interactions according to the GUI script until the parameters of the automated execution are complete 112.

The present invention accordingly possesses many advantages over prior art GUI recording/playback tools. The ability to effectively identify UI elements and interact appropriately allows the invention to more accurately mirror how a user interacts with the application irrespective of the underlying implementation details. The result is a robust approach, with respect to timing, UI positioning and minor UI styling changes, to replaying recorded user interactions for automated execution of arbitrary graphical interface applications. The use of two different image processing algorithms imparts an opportunity to save computation time and thereby allow the test framework to respond to interface events more quickly.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of quality assurance testing, it is useful for the automated execution of a software application for any purpose, including but not limited to development, demonstration, or business process automation. More generally, the invention is applicable to any system which may have high bandwidth multi-parametric variations and correlated activities. It is therefore contemplated that such modifications can be made without departing from the spirit or scope of the present invention as defined in the appended claims.

What is claimed is:

1. A computer system comprising:
   one or more processors which process program instructions;
   a memory device connected to said one or more processors; and
   program instructions residing in said memory device for monitoring image variations in a user interface of a software application as a user interacts with the software application executing on the computer system, detecting a user interaction with the user interface, comparing a first image of the user interface immediately prior to the user interaction with a second image of the user interface immediately after the user interaction to identify a region of interaction related to the user interaction wherein the region of interaction is based on a change in the user interface between the first image and a second image and corresponds to a boundary of a feature of the user interface which contains an object of the user interaction, placing a marker in a user interface evolution timeline to indicate a point in time when the user interaction occurred, and storing an image of the region of interaction, a profile of change, and coordinates of the user interaction in association with the marker, the profile of change representing differences between a pre-interaction profile and a post-interaction profile wherein the pre-interaction profile and post-interaction profile contain different lists of distinctive features currently visible in the user interface.

2. The computer system of claim 1 wherein the coordinates of the user interaction are normalized and relative to the region of interaction.

3. The computer system of claim 1 wherein the comparing includes:
    detecting that a change in the user interface has occurred using a fuzzy pattern matching algorithm which compares the first image to the second image; and
    responsive to said detecting, drawing boundaries for the region of interaction using image diffs between the first image and the second image.

4. The computer system of claim 1 wherein said program instructions further determine that the user interaction resulted in a new user interface element which is present in the second image but not present in the first image, and responsively create the image of the region of interaction using the first image based on a region of change which is different from the region of interaction, wherein the region of change constitutes a profile element in the profile of change.

5. The computer system of claim 1 wherein said program instructions further determine that the user interaction resulted in removal of a user interface element which is present in the first image but not present in the second image, and responsively create the image of the region of interaction using the first image.

6. The computer system of claim 1 wherein said program instructions further store an interaction interval for the user interaction in association with the marker wherein the region of interaction corresponds to a profile element in the profile of change.

7. The computer system of claim 6 wherein said program instructions further construct a GUI script from the user interface evolution timeline, and control automated execution of the software application using the GUI script, including matching a current interaction interval and current profile to the interaction interval and profile of change for the user interaction, and responsively locating a target region in an image of the current user interface of the automatically executing software application which corresponds to the region of interaction and applying the user interaction to the current user interface based on the coordinates normalized and relative to the target region.

8. A computer program product comprising:
    a computer-readable storage medium; and
    program instructions residing in said storage medium for monitoring image variations in a user interface of a software application as a user interacts with the software application executing on a computer system, detecting a user interaction with the user interface, comparing a first image of the user interface immediately prior to the user interaction with a second image of the user interface immediately after the user interaction to identify a region of interaction related to the user interaction wherein the region of interaction is based on a change in the user interface between the first image and a second image and corresponds to a boundary of a feature of the user interface which contains an object of the user interaction, placing a marker in a user interface evolution timeline to indicate a point in time when the user interaction occurred, and storing an image of the region of interaction, a profile of change, and coordinates of the user interaction in association with the marker, the profile of change representing differences between a pre-interaction profile and a post-interaction profile wherein the pre-interaction profile and post-interaction profile contain different lists of distinctive features currently visible in the user interface.

9. The computer program product of claim 8 wherein the coordinates of the user interaction are normalized and relative to the region of interaction.

10. The computer program product of claim 8 wherein the comparing includes:
    detecting that a change in the user interface has occurred using a fuzzy pattern matching algorithm which compares the first image to the second image; and
    responsive to said detecting, drawing boundaries for the region of interaction using image diffs between the first image and the second image.

11. The computer program product of claim 8 wherein said program instructions further determine that the user interaction resulted in a new user interface element which is present in the second image but not present in the first image, and responsively create the image of the region of interaction using the first image based on a region of change which is different from the region of interaction, wherein the region of change constitutes a profile element in the profile of change.

12. The computer program product of claim 8 wherein said program instructions further determine that the user interaction resulted in removal of a user interface element which is present in the first image but not present in the second image, and responsively create the image of the region of interaction using the first image.

13. The computer program product of claim 8 wherein said program instructions further store an interaction interval for the user interaction in association with the marker wherein the region of interaction corresponds to a profile element in the profile of change.

14. The computer program product of claim 13 wherein said program instructions further construct a GUI script from the user interface evolution timeline, and control automated execution of the software application using the GUI script, including matching a current interaction interval and current profile to the interaction interval and profile of change for the user interaction, and responsively locating a target region in an image of the current user interface of the automatically executing software application which corresponds to the region of interaction and applying the user interaction to the current user interface based on the coordinates normalized and relative to the target region.

15. A method of recording the evolution of a user interface for a software application, comprising:
    monitoring image variations in the user interface as a user interacts with the software application executing on a computer system;
    detecting a user interaction with the user interface during said monitoring;
    comparing a first image of the user interface immediately prior to the user interaction with a second image of the user interface immediately after the user interaction to identify a region of interaction related to the user interaction, wherein the region of interaction is based on a change in the user interface between the first image and a second image, and corresponds to a boundary of a feature of the user interface which contains an object of the user interaction;
    placing a marker in a user interface evolution timeline to indicate a point in time when the user interaction occurred; and storing an image of the region of interaction, a profile of change, and coordinates of the user interaction in association with the marker, the profile of change representing differences between a pre-interaction profile and a post-interaction profile wherein the pre-interaction profile and post-interaction profile contain different lists of distinctive features currently visible in the user interface.

16. The method of claim 15 wherein the coordinates of the user interaction are normalized and relative to the region of interaction.

17. The method of claim 15 wherein said comparing includes:
   detecting that a change in the user interface has occurred using a fuzzy pattern matching algorithm which compares the first image to the second image; and
   responsive to said detecting, drawing boundaries for the region of interaction using image diffs between the first image and the second image.

18. The method of claim 15, further comprising:
   determining that the user interaction resulted in a new user interface element which is present in the second image but not present in the first image; and
   responsive to said determining, creating the image of the region of interaction using the first image based on a region of change which is different from the region of interaction, wherein the region of change constitutes a profile element in the profile of change.

19. The method of claim 1, further comprising:
   determining that the user interaction resulted in removal of a user interface element which is present in the first image but not present in the second image; and
   responsive to said determining, creating the image of the region of interaction using the first image.

20. The method of claim 15, further comprising storing an interaction interval for the user interaction in association with the marker wherein the region of interaction corresponds to a profile element in the profile of change.

21. The method of claim 20, further comprising:
   constructing a GUI script from the user interface evolution timeline; and
   controlling automated execution of the software application using the GUI script, wherein said controlling includes matching a current interaction interval and current profile to the interaction interval and profile of change for the user interaction and, responsive to said matching, locating a target region in an image of the current user interface of the automatically executing software application which corresponds to the region of interaction and applying the user interaction to the current user interface based on the coordinates normalized and relative to the target region.

22. A method of automating execution of a graphical interface application, comprising:
   receiving a metric record of prior usage of the graphical interface application including a plurality of user interactions with a user interface of the graphical interface application, each user interaction having a recorded region of interaction image dependent upon a change in the user interface during the prior usage, a recorded interaction interval, a recorded profile of change representing differences between a pre-interaction profile and a post-interaction profile wherein the pre-interaction profile and post-interaction profile contain different lists of distinctive features currently visible in the user interface, and recorded interaction coordinates;
   monitoring image variations in the user interface of the graphical interface application;
   matching a current interaction interval and current profile for the user interface of the graphical interface application to a recorded interaction interval and recorded profile of change for a matching one of the user interactions;
   locating a target region in an image of the user interface of the graphical interface application which corresponds to a recorded region of interaction image for the matching user interaction, wherein the recorded region of interaction image corresponds to a boundary of a feature of the user interface which contains an object of the matching user interaction; and
   automatically applying the matching user interaction to the user interface of the graphical interface application using the recorded interaction coordinates.

23. The method of claim 22 wherein the target region is located using normalized cross-correlation.

24. The method of claim 22 wherein the recorded interaction coordinates are applied normalized and relative to the target region.

25. The method of claim 22 wherein the region of interaction image is based on whether a region of change, different from the region of interaction, constitutes a profile element in the profile of change that was added or removed.

26. A method of automating execution of a graphical interface application, comprising:
   recording an evolution timeline of a user interface for the graphical interface application by monitoring image variations in the user interface as a user interacts with the software application executing on a computer system, detecting a user interaction with the user interface during said monitoring, comparing a first image of the user interface immediately prior to the user interaction with a second image of the user interface immediately after the user interaction to identify a region of interaction related to the user interaction wherein the region of interaction is based on a change in the user interface between the first image and a second image and corresponds to a boundary of a feature of the user interface which contains an object of the user interaction, placing a marker in the evolution timeline to indicate a point in time when the user interaction occurred, and storing an image of the region of interaction, an interaction interval, interaction coordinates and a profile of change for the user interaction in association with the marker wherein the profile of change represents differences between a pre-interaction profile and a post-interaction profile, the pre-interaction profile and post-interaction profile contain different lists of distinctive elements currently visible in the user interface, and the region of interaction corresponds to a profile element in the profile of change; and
   controlling the graphical interface application during a simulation by monitoring image variations in the user interface of during the simulation, matching a current interaction interval and current profile for the user interface of the graphical interface application to a recorded interaction interval and recorded profile of change for a matching one of the user interactions in the evolution timeline, locating a target region in an image of the user interface of the graphical interface application which corresponds to a recorded region of interaction image for the matching user interaction, and automatically applying the matching user interaction to the user interface of the graphical interface application using the recorded interaction coordinates normalized and relative to the target region.

\* \* \* \* \*